United States Patent
Matsuhisa et al.

(10) Patent No.: US 7,517,611 B2
(45) Date of Patent: Apr. 14, 2009

(54) ALKALINE DRY BATTERY

(75) Inventors: Ichiro Matsuhisa, Hyogo (JP); Seiji Wada, Osaka (JP); Yasushi Sumihiro, Hyogo (JP); Yasuhiko Syoji, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/119,827

(22) Filed: May 13, 2008

(65) Prior Publication Data

US 2009/0053584 A1 Feb. 26, 2009

(30) Foreign Application Priority Data

Aug. 23, 2007 (JP) ............... 2007-217176
Dec. 4, 2007 (JP) ............... 2007-313519

(51) Int. Cl.
*H01M 2/08* (2006.01)
*H01M 2/06* (2006.01)
*H01M 6/02* (2006.01)

(52) U.S. Cl. .............. 429/185; 429/181; 29/623.2

(58) Field of Classification Search ........... 29/623.2; 429/181, 185
See application file for complete search history.

(56) References Cited

U.S. PATENT DOCUMENTS

| 4,567,118 A | 1/1986 | Connelly |
| RE38,518 E | 5/2004 | Tucholski |
| 2002/0127470 A1 | 9/2002 | Syvertsen et al. |
| 2006/0083985 A1 * | 4/2006 | Dunham ............... 429/185 |

FOREIGN PATENT DOCUMENTS

| JP | 60-180058 | 9/1985 |
| JP | 05-283080 | 10/1993 |
| JP | 08-124544 | 5/1996 |
| JP | 10-162800 | 6/1998 |
| JP | 11-144690 | 5/1999 |
| JP | 2000-085018 | 3/2000 |
| JP | 2005-079021 | 3/2005 |
| JP | 2007-080574 | 3/2007 |
| JP | 2007-287554 | 11/2007 |

\* cited by examiner

*Primary Examiner*—Dah-Wei D Yuan
*Assistant Examiner*—Maria J Laios
(74) *Attorney, Agent, or Firm*—McDermott Will & Emery LLP (57) ABSTRACT

A leak-proof alkaline dry battery including a battery case and a seal unit for closing the opening of the battery case. The seal unit includes: a negative electrode terminal plate; a negative electrode current collector nail electrically connected to the terminal plate; and a resin seal member. The resin seal member includes: a central cylindrical part having an opening through which the body of the negative electrode current collector nail is inserted; an outer peripheral cylindrical part interposed between a peripheral edge of the negative electrode terminal plate and an open edge of the battery case; a connecting part interconnecting the central and outer peripheral cylindrical parts; and a thinned section formed in the connecting part. The body of the negative electrode current collector nail is fitted to the opening of the central cylindrical part in a particular fit relation to prevent leakage for a long time.

6 Claims, 5 Drawing Sheets

ALKALINE DRY BATTERY

FIELD OF THE INVENTION

The invention relates to alkaline dry batteries, and, more particularly, to a seal unit for use in an alkaline dry battery.

BACKGROUND OF THE INVENTION

Alkaline dry batteries are currently widely used as the main power source for daily use articles, toys, hobby goods, game machines, portable music players, electronic devices, etc. Alkaline dry batteries are used in various environments, and may be used for as long as several years. Therefore, they are required to have high leakage resistance so that they should not leak even under a hot and humid environment for an extended period of time.

There are three possible routes through which electrolyte of common alkaline dry batteries leaks. These routes of electrolyte leakage are described with reference to FIG. 6, which is an enlarged cross-sectional view of the main part of the seal portion of a typical AA-size alkaline dry battery.

Figure 6:
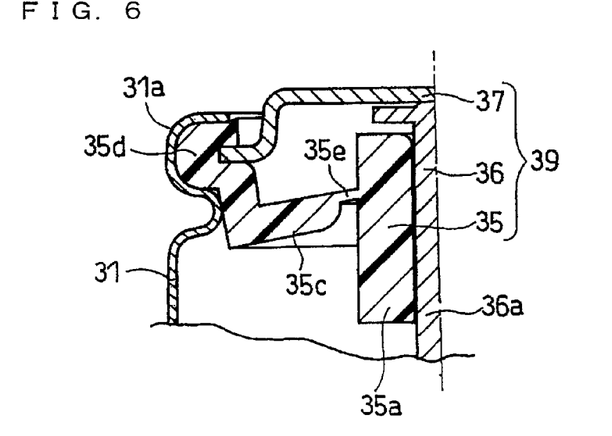
FIG. 6 is a cross-sectional view of the seal portion of a typical AA-size alkaline dry battery.

In the battery of FIG. 6, the open edge of a positive electrode case 31 is bent inward and in an arch to form a crimp 31a, so that a seal unit 39 is attached to the opening of the positive electrode case 31 to seal the opening. The seal unit 39 is prepared by welding a negative electrode current collector nail 36 to the center of a negative electrode terminal plate 37 in advance, and forcefully inserting a body 36a of the negative electrode current collector nail 36 through the opening (not shown) of a central cylindrical part 35a of a resin seal member 35 for integration. At this time, an outer peripheral cylindrical part 35d of the resin seal member 35 is sandwiched between the negative electrode terminal plate 37 and the positive electrode case 31.

In this alkaline dry battery, the first route of electrolyte leakage is a route of leakage of alkaline electrolyte between the inner face of the open edge of the positive electrode case 31 and the outer surface of the outer peripheral cylindrical part 35d of the resin seal member 35. However, the leakage through this route has been addressed by the development of various sealants and the research into rigid seal structure, so that commercially available dry batteries now have high reliability.

The second route is a route of leakage of alkaline electrolyte between the body 36a of the negative electrode current collector nail 36 and the central cylindrical part 35a of the resin seal member 35. The negative electrode current collector nail 36 is forcefully inserted through the opening of the central cylindrical part 35a, so that the alkaline electrolyte is sealed in.

When the negative electrode current collector nail 36 is loosely fitted to the central cylindrical part 35a, the alkaline electrolyte creeps up therebetween (hereinafter also referred to as "creeping"), thereby resulting in leakage. On the other hand, when the fit therebetween is too tight, the central cylindrical part 35a becomes cracked due to stress, and thus the seal is broken, thereby resulting in leakage of the alkaline electrolyte. When the resin seal member 35 is made of polyamide, in particular, it tends to become cracked since it is hydrolyzed by the alkaline electrolyte and deteriorates with time.

To prevent leakage through the second route, various proposals have been made (e.g., Japanese Laid-Open Patent Publications No. 2007-80574 and No. Hei 8-124544), but there is a need for further improvements.

As for the third route, a part of the connecting part 35c of the resin seal member 35 becomes cracked and broken due to stress, and the alkaline electrolyte leaks through the broken portion. This phenomenon tends to occur particularly in the thinned section 35e, since the stress or strain applied to the outer peripheral cylindrical part 35d of the resin seal member 35 to attach the seal unit 39 to the opening of the positive electrode case 31 tends to concentrate in the thinned section 35e. When the resin seal member 35 is made of polyamide, in particular, it tends to break since it is hydrolyzed by the alkaline electrolyte and deteriorates with time.

To solve this problem, for example, Japanese Laid-Open Patent Publications No. 2005-79021 and No. Hei 10-162800 disclose techniques of modifying the shape or structure of the seal unit 39 in order to reduce the transmission of stress or absorb stress. According to these conventional techniques, for example, the connecting part is provided with a redundant structure and thus some play, in order to prevent the stress created to attach the seal unit from being exerted on the connecting part.

However, alkaline dry batteries, which are widely used as the main power source for the above-noted various devices, are required to have not only leakage resistance but also higher capacity in order to provide longer battery life. It is thus necessary to pack a larger amount of power generating elements into the battery case and reduce the size of the seal unit. Therefore, providing the connecting part with a redundant structure, as in the aforementioned conventional techniques, not only increases the material costs but also becomes an obstacle to heightening the capacity of the dry battery.

As discussed above, many technical problems remain unsolved with respect to the leakage resistance of alkaline dry batteries, in particular, the leakage through the second and third routes.

The invention has been made in view of the above-discussed problems and aims to provide a leak-proof alkaline dry battery, in which alkaline electrolyte hardly leaks between the central cylindrical part of the resin seal member and the negative electrode current collector even during long-term storage, and leakage resulting from stress cracking and breakage of the thinned section of the resin seal member is prevented.

BRIEF SUMMARY OF THE INVENTION

In order to achieve the aforementioned aim, an alkaline dry battery of the invention includes: a battery case with an opening for housing power generating elements including an alkaline electrolyte; and a seal unit for closing the opening of the battery case. The seal unit includes: a negative electrode terminal plate; a negative electrode current collector having a columnar body and electrically connected to the negative electrode terminal plate; and a resin seal member. The resin seal member includes: a central cylindrical part having an opening through which the body of the negative electrode current collector is inserted; an outer peripheral cylindrical part interposed between a peripheral edge of the negative electrode terminal plate and an open edge of the battery case; a connecting part connecting the central cylindrical part and the outer peripheral cylindrical part; and a thinned section formed in the connecting part and configured to break due to gas pressure. The seal unit is attached to the opening of the battery case to seal the opening of the battery case by bending the open edge of the battery case over an upper edge of the outer peripheral cylindrical part of the seal member and crimping it inward to compress the peripheral edge of the negative electrode terminal plate. The negative electrode current collector and the resin seal member satisfy the following formulas 1 and 2:

$$1.02 \leq Rc/Rb \leq 1.08 \quad (1)$$

$$7.7 \leq 3.14 \times Rc \times L \leq f(Rc/Rb) \quad (2)$$

where Rc represents the diameter (mm) of the body of the negative electrode current collector, Rb represents the diameter (mm) of the opening of the central cylindrical part of the resin seal member, L represents the length (mm) of the opening of the central cylindrical part of the resin seal member, and $$f(Rc/Rb): f(Rc/Rb) = 2048.4(Rc/Rb)^2 - 4473(Rc/Rb) + 2456.9.$$

In this configuration, the formula 1 defines the upper and lower limit values of the fit ratio (Rc/Rb), and the formula 2 defines the upper boundary and lower limit values of the fit area (3.14×Rc×L). As used herein, the fit ratio (Rc/Rb) refers to the ratio of the diameter Rc of the body of the negative electrode current collector to the diameter Rb of the opening of the central cylindrical part of the resin seal member. The fit area (3.14×Rc×L), as used herein, refers to the area of the outer surface of the body of the negative electrode current collector in contact with the inner surface of the opening of the central cylindrical part when the negative electrode current collector is forcefully inserted through the opening.

As the value of the fit ratio (Rc/Rb) increases, the stress exerted on the central cylindrical part upon the insertion of the negative electrode current collector through the opening increases. Hence, as the fit ratio increases, the possibility that the central cylindrical part will become cracked due to stress increases. The present inventors have experimentally confirmed that when the fit ratio (Rc/Rb) exceeds the upper limit value 1.08 of the formula 1, the possibility that the central cylindrical part of the resin seal member will become cracked due to stress in an environment, for example, at 80° C. within 3 months increases significantly (see Examples below).

Conversely, if the fit ratio (Rc/Rb) is too low, the fit between the opening and the body of the negative electrode current collector becomes loose, and the possibility that the alkaline electrolyte will creep up and leak between the central cylindrical part and the negative electrode current collector increases. When the fit ratio (Rc/Rb) is lower than the lower limit value 1.02 of the formula 1, the possibility that leakage will occur due to creeping between the central cylindrical part and the negative electrode current collector in an environment, for example, at 60° C. and a humidity of 90% within 3 months increases significantly.

Further, if the fit area (3.14×Rc×L) is too small, the possibility of leakage due to creeping also increases. The present inventors have experimentally confirmed that when the fit ratio (Rc/Rb) satisfies the formula 1 and the fit area (3.14×Rc×L) is equal to or higher than the lower limit value 7.7 of the formula 2, the possibility that leakage will occur due to creeping in an environment, for example, at 60° C. and a humidity of 90% is significantly low for at least 3 months (see Examples below).

Conversely, if the fit ratio (Rc/Rb) is too high or the fit area (3.14×Rc×L) is too large, the thinned section may become cracked and broken due to stress unless the connecting part of the resin seal member has a redundant structure. That is, when the seal unit is attached to the opening of the battery case to seal the opening, the outer peripheral cylindrical part of the resin seal member is pulled, so that stress is exerted on the connecting part. When the resin seal member is capable of moving easily in the axial direction of the body of the negative electrode current collector, the resin seal member moves in such a direction as to reduce the stress. As a result, the stress is released or reduced, and the possibility of breakage of the thinned section becomes low.

Whether or not or how easily the resin seal member is capable of moving in the axial direction of the body of the negative electrode current collector is determined by the fit ratio (Rc/Rb) and the fit area (3.14×Rc×L), provided that the coefficient of static friction is a given value. Specifically, when the fit ratio (Rc/Rb) becomes high, it becomes difficult for the resin seal member to move, and the possibility of breakage of the thinned section increases. Likewise, when the fit area (3.14×Rc×L) becomes large, it also becomes difficult for the resin seal member to move, and the possibility of breakage of the thinned section increases.

Therefore, the upper limit of the fit area (3.14×Rc×L) for preventing the thinned section from becoming broken in a predetermined environment for a predetermined period can be expressed as a function of the fit ratio (Rc/Rb). The upper boundary f (Rc/Rb), which is such a function, is expected to describe a downward-sloping curve that is convex downward. Thinking that the upper boundary f (Rc/Rb) can be approximated by a quadratic function, the present inventors have determined the coefficient of each term of the upper boundary f (Rc/Rb), based on a large number of experimental results, so as to minimize the possibility of breakage of the thinned section in an environment, for example, at 80° C. for at least 3 months (see Examples below).

In a preferable mode of the invention, the alkaline dry battery is of the AA or AAA size, and when the seal unit is attached to the opening of the battery case, the central cylindrical part of the resin seal member moves in the axial direction of the body of the negative electrode current collector for a distance of 0.1 to 0.4 mm.

That is, in the case of the negative electrode current collector and the resin seal member satisfying the formulas 1 and 2, when the seal unit is attached to the opening of the battery case, the central cylindrical part of the resin seal member moves in the axial direction of the body of the negative electrode current collector for a distance of 0.1 to 0.4 mm, unless the connecting part has a redundant structure (see Examples below). As a result, breakage of the thinned section can be prevented.

In another preferable mode of the invention, the alkaline dry battery is of the AA or AAA size, and the opening of the central cylindrical part of the resin seal member has a diameter of 1.05 to 1.45 mm.

In still another preferable mode of the invention, the alkaline dry battery is of the AA or AAA size, and the opening of the central cylindrical part of the resin seal member has a length of 2.2 to 3.8 mm.

In a further preferable mode of the invention, the alkaline dry battery is of the AA or AAA size, and the body of the negative electrode current collector has a diameter of 1.08 to 1.57 mm.

In a still further preferable mode of the invention, the thinned section of the resin seal member does not break in an environment at 80° C. for at least 3 months, and the alkaline electrolyte does not leak between the central cylindrical part of the resin seal member and the body of the negative electrode current collector inserted through the opening of the central cylindrical part in an environment at 60° C. and a humidity of 90% for at least 3 months.

The invention can provide a leak-proof alkaline dry battery, in which alkaline electrolyte hardly leaks between the central cylindrical part of the resin seal member and the negative electrode current collector even during long-term storage, and leakage resulting from stress cracking and breakage of the thinned section of the resin seal member is prevented.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Referring now to FIGS. 1 to 3B, one embodiment of the invention is described.

Figure 1:
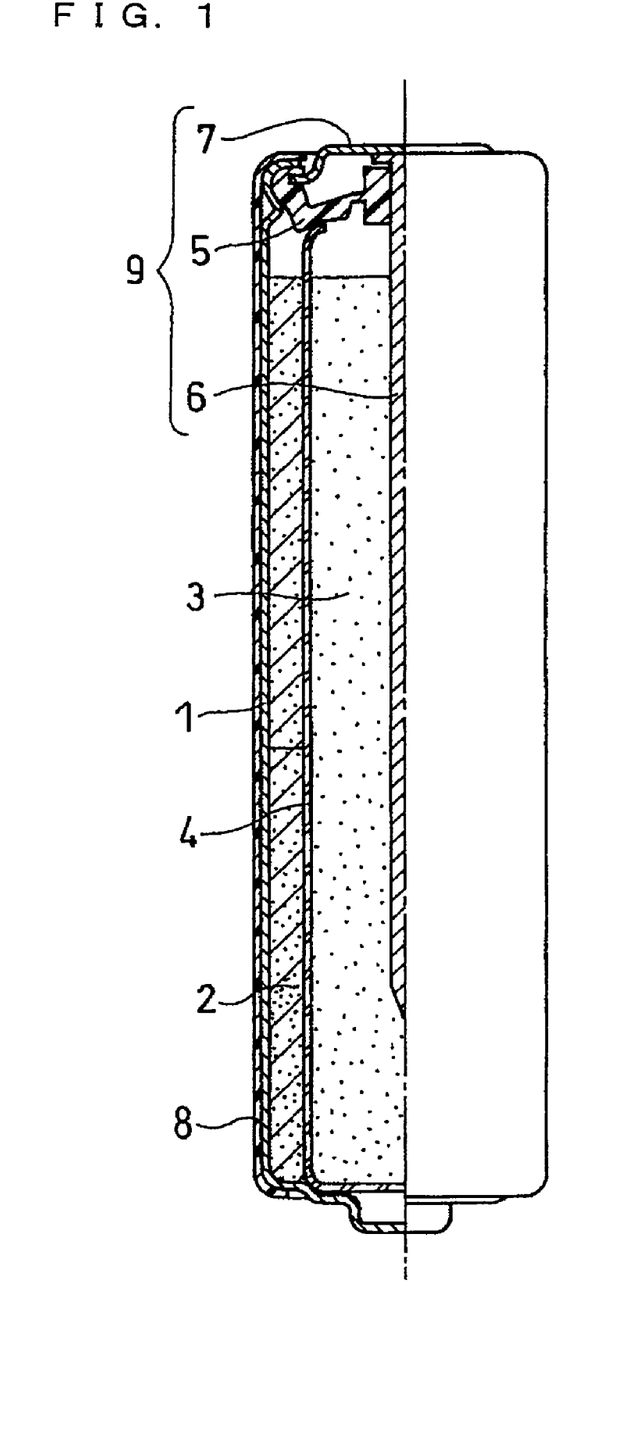
FIG. 1 is a partially cross-sectional view of an alkaline dry battery according to one embodiment of the invention.
Figure 2:
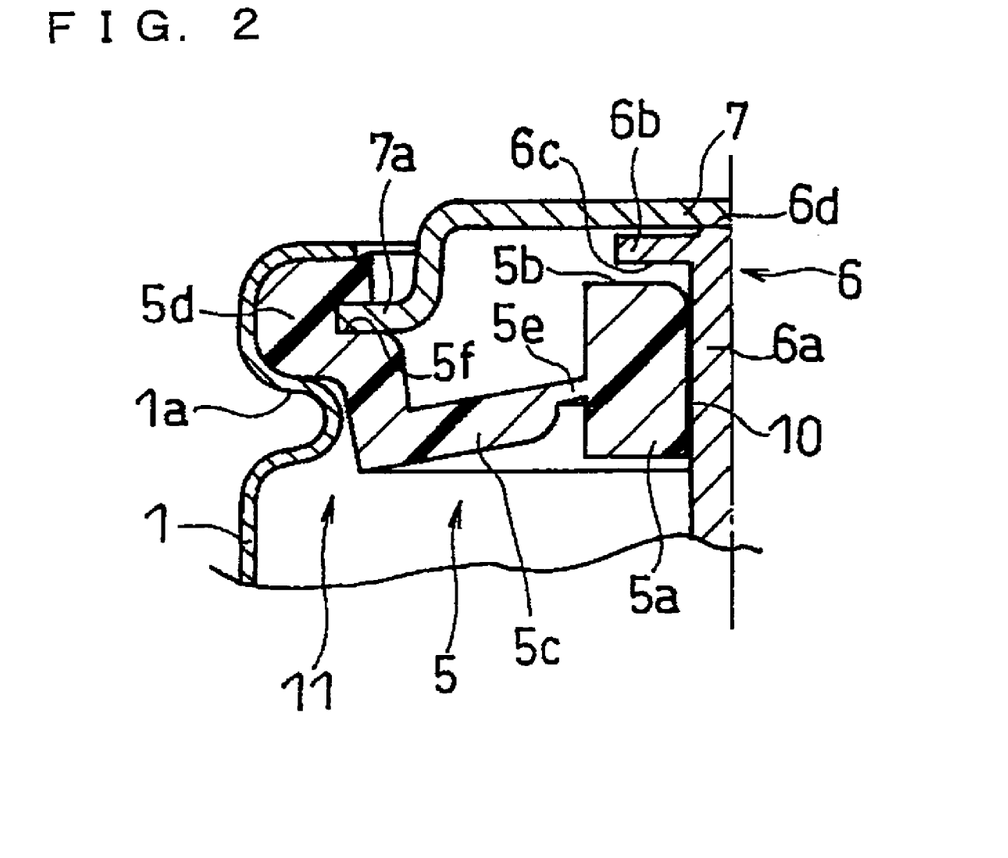
FIG. 2 is a cross-sectional view of the structure of the seal portion of the alkaline dry battery of FIG. 1.
Figure 3A:
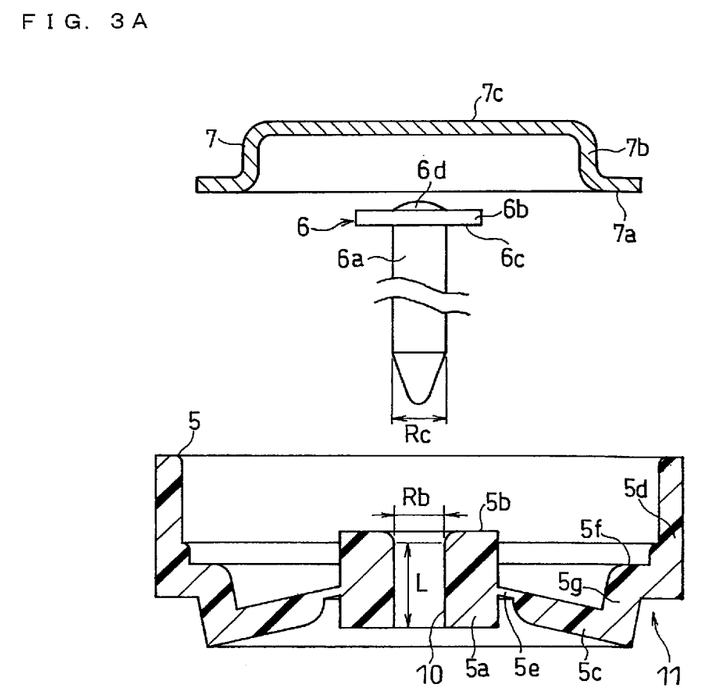
FIG. 3A is a cross-sectional view of the structure of the seal unit that is disassembled.
Figure 3B:
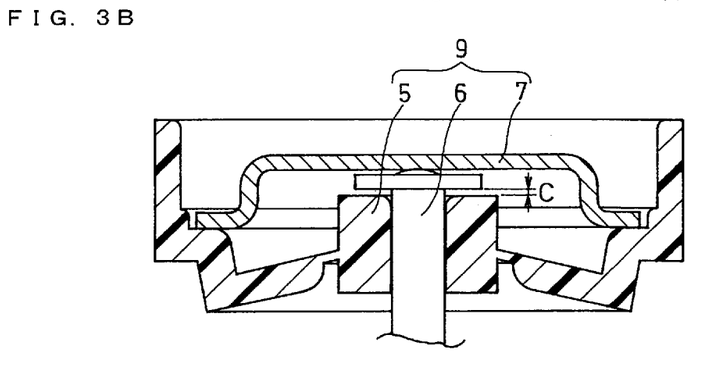
FIG. 3B is a cross-sectional view of the structure of the seal unit that is assembled.

FIG. 1 is a partially cross-sectional front view of a AA-size alkaline battery in one embodiment of the invention. FIG. 2 is an enlarged cross-sectional view of the main part of the seal portion of the alkaline dry battery of FIG. 1. FIG. 3A is a cross-sectional view of the structure of the seal unit that is disassembled. FIG. 3B is a cross-sectional view of the structure of the seal unit that is assembled.

As shown in FIG. 1, a cylindrical battery case 1 with a bottom contains a hollow cylindrical positive electrode mixture 2. The battery case 1 serves as the positive electrode terminal and is in contact with the positive electrode mixture 2. Also, a gelled negative electrode 3 is disposed in the hollow of the positive electrode mixture 2 with a cylindrical separator 4 with a bottom interposed therebetween. The positive electrode mixture 2, the separator 4, and the gelled negative electrode 3 contain an alkaline electrolyte. The separator 4 is, for example, a non-woven fabric composed mainly of polyvinyl alcohol fiber and rayon fiber. The battery case 1 is prepared by pressing, for example, a nickel-plated steel plate into predetermined dimensions and shape by known methods such as those described in Japanese Laid-Open Patent Publications No. Sho 60-180058 and No. Hei 11-144690.

The positive electrode mixture 2 is, for example, a mixture of a positive electrode active material including manganese dioxide powder, a conductive agent such as graphite powder, and an alkaline electrolyte such as potassium hydroxide aqueous solution. The gelled negative electrode 3 is, for example, a mixture of a negative electrode active material such as zinc powder or zinc alloy powder, a gelling agent such as sodium polyacrylate, and an alkaline electrolyte such as potassium hydroxide aqueous solution. The negative electrode active material is preferably a zinc alloy powder with a good corrosion resistance. In terms of environmental concerns, the negative electrode active material is more preferably a material free from mercury, cadmium, or lead, or any of these. The zinc alloy can be, for example, a zinc alloy containing indium, aluminum, and bismuth.

As illustrated in FIG. 2, power generating elements such as the positive electrode mixture 2 are placed in the battery case 1, and a step 1a is formed in the battery case 1 near the opening. The opening of the battery case 1 is sealed with a seal unit 9, which is composed of a negative electrode terminal plate 7, a negative electrode current collector nail 6 welded to the negative electrode terminal plate 7, and a resin seal member 5. The negative electrode current collector nail 6 is inserted into the center of the gelled negative electrode 3.

As illustrated in FIGS. 3A and 3B, the resin seal member 5 is composed of: a central cylindrical part 5a having an opening 10 through which the negative electrode current collector nail 6 is inserted; an outer peripheral cylindrical part 11 interposed between a peripheral edge 7a of the negative electrode terminal plate 7 and the open edge of the battery case 1; and a connecting part 5c connecting the central cylindrical part 5a and the outer peripheral cylindrical part 11 and having a thinned section 5e which serves as a safety valve. The outer peripheral cylindrical part 11 is composed of: an annular horizontal section 5f for receiving the peripheral edge 7a of the negative electrode terminal plate 7; an upper cylindrical section 5d that stands upward from the outer end of the horizontal section 5f; and a lower cylindrical section 5g that extends downward and slantwise from the inner end of the horizontal section 5f. The open edge of the battery case 1 is bent over the upper edge of the upper cylindrical section 5d and crimped inward to form a crimp, so that the peripheral edge 7a of the negative electrode terminal plate 7 is compressed between the crimp and the step 1a. The outer surface of the battery case 1 is covered with an exterior label 12.

The resin seal member 5 is prepared by injection molding polyamide, polypropylene, or the like into predetermined dimensions and shape, and it is particularly preferable to use 6,6-nylon, 6,10-nylon, or 6,12-nylon, which is resistant to alkali and heat. Also, there are two injection molding methods, namely, cold runner method and hot runner method. In the case of using relatively expensive 6,12-nylon, it is preferable to employ the hot runner method in which no runner is provided and the material loss is minimum.

With respect to the position of the resin injection inlet (resin injection gate) provided in the mold used in the injection molding of the resin seal member 5, there is no particular limitation. However, an injection molded item tends to become cracked near the resin injection inlet of the mold due to the residual stress resulting from the molding. If such stress cracking occurs on the gelled negative electrode 3 side (the inner side of the battery) of the resin seal member 5, the resin seal member 5 is subject to deterioration with time since it is hydrolyzed by the alkaline electrolyte contained in the gelled negative electrode 3 and other components. To avoid the undesirable effect of such hydrolysis, it is preferable to provide the resin injection inlet of the mold on the negative electrode terminal plate 7 side of the resin seal member 5.

Nevertheless, in consideration of mold production and ease of maintenance, it is desirable to provide the resin injection inlet of the mold on the gelled negative electrode 3 side of the resin seal member 5. More specifically, the mold is desirably produced such that it has the resin injection inlet at a position corresponding to an edge of the opening 10 on the gelled negative electrode 3 side (i.e., a lower end of the opening 10 of the central cylindrical part 5a in FIGS. 3A AND 3B). When the inlet is provided at such a position, the mold can be produced easily, and the resin can be filled into the portion of the mold corresponding to the end of the upper cylindrical section 5d in a reliable manner.

For these reasons, even when the resin injection inlet of the mold is provided on the gelled negative electrode 3 side of the resin seal member 5, the application of the invention to the formation of the negative electrode current collector nail 6 and the resin seal member 5, as described below, allows prevention of stress cracking of the resin seal member 5 near the resin injection inlet of the mold, in particular, stress cracking of the central cylindrical part 5a. Therefore, the invention is particularly necessary and effective when the resin injection inlet of the mold is provided on the gelled negative electrode 3 side of the resin seal member 5. That is, according to the invention, even when the resin injection inlet of the mold is provided on the gelled negative electrode 3 side of the resin seal member 5, the alkaline electrolyte hardly leaks between the central cylindrical part of the resin seal member and the negative electrode current collector nail even during long-term storage, and leakage resulting from stress cracking and breakage of the thinned section of the resin seal member can be prevented.

Also, the resin seal member 5 may contain other known functional materials such as a plasticizer, crystalline nucleating agent, antioxidant, mold release agent, lubricant, and antistatic agent, if necessary, unless the above-described effects of the invention are impaired. It should be noted that the effects of the invention are impaired, for example, by the use of a functional material containing some kind of metal salt or metal oxide, in particular, a molybdenum-based release agent or a copper-based antioxidant.

If such a metal salt or metal oxide is contained in the resin seal member 5, it may dissolve into the alkaline electrolyte. Particularly when molybdenum dissolves into the alkaline electrolyte, even in a trace amount, gas may be produced from the zinc powder or zinc alloy powder in the gelled negative electrode 3, thereby resulting in leakage. Also, if copper dissolves in the alkaline electrolyte, the dissolved copper may deposit on the surface of, for example, the zinc alloy powder and penetrate the separator 4, thereby causing an internal short-circuit. It is therefore preferable not to use a functional material containing molybdenum or copper in the resin seal member 5.

The negative electrode current collector nail 6 is produced by pressing a wire rod made of, for example, silver, copper, or brass into the shape of a nail of predetermined dimensions having a long needle-like body 6a and a flange 6b. Also, on the other side of the flange 6b from the body 6a is a head 6d, and the negative electrode current collector nail 6 and the negative electrode terminal plate 7 are connected via the head 6d. The surface of the negative electrode current collector nail 6 is preferably plated with tin or indium in order to remove the impurity attached when it is produced and obtain a cover-up effect. The negative electrode current collector nail 6 is produced by known methods described, for example, in Japanese Laid-Open Patent Publications No. Hei 5-283080 and No. 2001-85018.

When tin plating and indium plating are compared, tin plating is more preferable since it is inexpensive and versatile. However, when a commercially available plating liquid is used for tin plating, attention should be given to the amount of antimony contained therein. If even a trace amount of antimony is included in the gelled negative electrode 3 of the alkaline dry battery, gas may be produced from the zinc alloy powder, thereby leading to leakage.

It is thus necessary to select a plating liquid with an antimony content of 0.3 ppm or less or refine a plating liquid so that it has an antimony content of 0.3 ppm or less. By doing so, the antimony content per square centimeter of the surface area of the negative electrode current collector nail 6 can be reduced to 0.015 μg or less. As a result, it is possible to suppress electrolyte leakage due to gas production in the negative electrode as well as electrolyte leakage ascribed to the resin seal member 5.

In forcefully inserting the negative electrode current collector nail 6 through the opening 10 of the central cylindrical part 5a of the resin seal member 5, it is desirable to apply a sealant to the body 6a of the negative electrode current collector nail 6 in advance. The sealant is desirably a high viscosity resin with a good alkali resistance, and the use of, for example, a polyamide resin with an amine value of 50 to 200 is particularly preferable.

As illustrated in FIGS. 3A AND 3B, the negative electrode terminal plate 7 is a hat-shaped member having a flat ring-like peripheral edge 7a, a central flat part 7c, and a cylindrical part 7b connecting the inner end of the peripheral edge 7a and the outer end of the flat part 7c. Also, the negative electrode terminal plate 7 has a plurality of gas holes (not shown) in the peripheral edge 7a for releasing the pressure when the thinned section 5e (serving as the safety valve) of the resin seal member 5 breaks. The negative electrode terminal plate 7 is produced by pressing, for example, a nickel-plated steel plate or a tin-plated steel plate into predetermined dimensions and shape.

In the alkaline dry battery with the above-described structure in this embodiment, the resin seal member 5 of the seal unit 9 and the negative electrode current collector nail 6 are formed so as to satisfy the following formulas 1 and 2:

$$1.02 \leq Rc/Rb \leq 1.08 \tag{1}$$

$$7.7 \leq 3.14 \times Rc \times L \leq f(Rc/Rb) \tag{2}$$

where Rc represents the diameter (mm) of the body of the negative electrode current collector nail 6, Rb represents the diameter (mm) of the opening 10 of the central cylindrical part 5a of the resin seal member 5, L represents the length (mm) of the portion of the opening 10 of the central cylindrical part 5a of the resin seal member 5 in contact with the body 6a of the negative electrode current collector nail 6, and $f(Rc/Rb)$: $f(Rc/Rb)=2048.4(Rc/Rb)^2-4473(Rc/Rb)+2456.9$. As a result, it is possible to prevent stress cracking of the central cylindrical part 5a of the resin seal member 5, stress cracking of the thinned section 5e of the connecting part 5c of the resin seal member 5, and leakage of the alkaline electrolyte due to creeping between the central cylindrical part 5a of the resin seal member 5 and the negative electrode current collector nail 6.

In the above formula 1, the term "Rc/Rb" refers to the ratio of the diameter Rc of the body of the negative electrode current collector nail 6 to the diameter Rb of the opening 10 of the central cylindrical part 5a of the resin seal member 5. This ratio is hereinafter referred to as the fit ratio. In the battery of FIG. 1, the resin seal member 5 and the negative electrode current collector nail 6 are formed such that the fit ratio (Rc/Rb) is 1.02 to 1.08 as shown in the formula 1.

Also, in the formula 2, the term "3.14×Rc×L" refers to the value obtained by multiplying the perimeter (3.14×Rc) of the body 6a of the negative electrode current collector nail 6 by the length L of the portion of the opening 10 of the resin seal member 5 in contact with the body 6a. That is, this value corresponds to the area of the body 6a of the negative electrode current collector nail 6 in substantial contact with the inner surface of the opening 10 when the negative electrode current collector nail 6 is forcefully inserted through the opening 10. This area is hereinafter referred to as the fit area. According to the formula 2, in the battery of FIG. 1, the resin seal member 5 and the negative electrode current collector nail 6 are formed such that the fit area (3.14×Rc×L) is at least 7.7 mm² or more.

According to the formula 2, the upper limit of the fit area (3.14×Rc×L) is given by the upper boundary f(Rc/Rb). The upper boundary f(Rc/Rb) is represented by a quadratic function of the fit ratio (Rc/Rb) and describes a downward-sloping curve that is convex downward in the range of the fit ratio (Rc/Rb) of the formula 1 (see FIG. 4).

When the fit area is excessively large at a high fit ratio, it is difficult for the central cylindrical part 5a of the resin seal member 5 to move, so that the stress exerted on the thinned section 5e is hard to decrease. On the other hand, when the fit area is too small at a low fit ratio (Rc/Rb), creeping of the alkaline electrolyte cannot be effectively suppressed. Based on such findings on the relation between the fit area and the fit ratio, the present inventors have conducted a number of experiments as shown in the following Examples. As a result, they have found that the upper limit of the fit area (3.14×Rc×L) for achieving a certain level of leakage resistance describes a curve represented by f(Rc/Rb), and concluded that the resin seal member 5 and the negative electrode current collector nail 6 should be formed so as to satisfy the formulas 1 and 2. By doing so, even during long-term storage of an alkaline dry battery, the alkaline electrolyte hardly leaks between the central cylindrical part 5a of the resin seal member 5 and the negative electrode current collector nail 6, and leakage resulting from stress cracking and breakage of the thinned section 5e of the resin seal member 5 can be prevented. Therefore, the leakage resistance can be improved.

Also, in the case of a AA-size alkaline dry battery, when the resin seal member 5 and the negative electrode current collector nail 6 are formed so as to satisfy the formulas 1 and 2, the distance the central cylindrical part 5a of the resin seal member 5 moves along the body of the negative electrode current collector nail 6 when the seal unit 9 is attached is 0.1 to 0.4 mm. That is, if the move distance is 0.1 to 0.4 mm, it can be judged that the resin seal member 5 and the negative electrode current collector nail 6 are formed so as to satisfy the formulas 1 and 2.

Likewise, in the case of a AAA-size alkaline dry battery, the distance the central cylindrical part 5a of the resin seal member 5 moves along the body of the negative electrode current collector nail 6 when the seal unit 9 is attached is also 0.1 to 0.4 mm. That is, if the move distance is 0.1 to 0.4 mm, it can be judged that the resin seal member 5 and the negative electrode current collector nail 6 are formed so as to satisfy the formulas 1 and 2.

The move distance is further described with reference to FIGS. 3A AND 3B. When the seal unit 9 is attached, stress or strain is applied to the outer peripheral cylindrical part 11 of the resin seal member 5. This stress or strain is then exerted on the central cylindrical part 5a through the connecting part 5c, so that the central cylindrical part 5a moves in the axial direction of the negative electrode current collector nail 6 for some distance. This distance is the move distance and can be measured, for example, by the following method.

(1) As illustrated in FIG. 3B, the negative electrode current collector nail 6 is inserted through the opening 10 of the central cylindrical part 5a of the resin seal member 5, and the distance C (C1) between a lower face 6c of the flange 6b of the negative electrode current collector nail 6 and an upper face 5b of the central cylindrical part 5a of the resin seal member 5 is measured;

(2) The lower face of the peripheral edge 7a of the negative electrode terminal plate 7 is placed on the horizontal section 5f of the resin seal member 5, and the seal unit 9 is attached by crimping;

(3) After the attachment, the distance C (C2) is measured again to calculate the difference ΔC (ΔC=|C2−C1|) from the distance C (C1) before the attachment.

In this way, the move distance can be measured. The distance C can be directly measured by impregnating the whole seal unit 9 or whole battery with epoxy resin or the like, fixing the epoxy resin by fixation agent, and cutting it.

More specifically, the dimensions of the respective components of the alkaline dry battery of FIG. 1 are set as follows. When the battery of FIG. 1 is of the AA or AAA size, the opening 10 of the central cylindrical part 5a of the resin seal member 5 is formed so that the diameter Rb is 1.05 to 1.45 mm. Also, the opening 10 of the central cylindrical part 5a of the resin seal member 5 is formed so that the length L of the portion in contact with the outer surface of the body 6a of the negative electrode current collector nail 6 is 2.2 to 3.8 mm. Also, the body 6a of the negative electrode current collector nail 6 is formed so that the diameter Rc is 1.08 to 1.57 mm.

The alkaline electrolyte used in the positive electrode mixture 2 and the gelled negative electrode 3 is an aqueous solution with a potassium hydroxide concentration of 30 to 40% by weight and a zinc oxide concentration of 0.5 to 3% by weight. More preferably, the potassium hydroxide concentration of the aqueous solution is 32 to 35% by weight. In this case, it is possible to suppress deterioration of the resin seal member 5, which is made of polyamide, due to hydrolysis while suppressing creeping of the alkaline electrolyte. That is, in an alkaline electrolyte containing hydroxide ions ($OH^-$) as the catalyst, the supply of water is easy. Thus, a lower potassium hydroxide concentration promotes hydrolysis of polyamide in the alkaline electrolyte. However, due to electrocapillary phenomenon and the influence by the difference in the concentration of hydroxide ions ($OH^-$) between inside and outside the battery, a higher potassium hydroxide concentration facilitates creeping of the alkaline electrolyte.

As described above, by forming the resin seal member 5 and the negative electrode current collector nail 6 satisfying the formulas 1 and 2, it is possible to provide an alkaline dry battery in which the thinned section 5e of the resin seal member 5 does not break in an environment at 80° C. for at least 3 months and the alkaline electrolyte does not leak between the central cylindrical part 5a of the resin seal member 5 and the negative electrode current collector nail 6 in an environment at 60° C. and a humidity of 90% for at least 3 months.

Examples of the invention are hereinafter described in detail, but the invention is not to be construed as being limited to the following Examples.

EXAMPLE 1

In Example 1, a large number of AA-size alkaline dry batteries with various fit ratios and fit areas were produced, and they were subjected to a test in order to examine the relation between the fit ratio, the fit area, and the leakage resistance. The batteries used in the test were produced in the following manner.

The resin seal member 5 was prepared from 6,6 nylon. At this time, the resin seal member was injection molded using a mold that had a resin injection inlet at a position corresponding to an edge of the opening on the gelled negative electrode side (i.e., a lower end of the opening of the central cylindrical part in FIGS. 3A AND 3B). The diameter Rb of the opening 10 of the central cylindrical part 5a was set to 1.20 mm in all the batteries. The length L of the portion of the opening 10 in contact with the body 6a of the negative electrode current collector nail 6 was varied in the range of 2.0 to 6.3 mm to provide seven lengths. The diameter Rc of the body 6a of the negative electrode current collector nail 6 was varied in the range of 1.22 to 1.31 mm to provide ten diameters. In this way, a total of 26 kinds of seal units 9 were prepared. In each of these seal units 9, the distance C (C1) between the lower face 6c of the flange 6b of the negative electrode current collector nail 6 and the upper face 5b of the central cylindrical part 5a of the resin seal member 5 was 0.2 mm. Using these seal units 9, AA-size alkaline dry batteries No. 1 to No. 16 and No. 21 to No. 30 were produced in the same manner as described in the above embodiment. For each of these batteries, 100 test samples were prepared, and a potassium hydroxide aqueous solution with a KOH concentration of 33% by weight was used as the alkaline electrolyte for the positive electrode mixture and the gelled negative electrode.

EXAMPLE 2

In Example 2, a large number of AAA-size alkaline dry batteries with various fit ratios and fit areas were produced, and they were subjected to a test in order to examine the relation between the fit ratio, the fit area, and the leakage resistance. The batteries used in the test were produced in the following manner.

The resin seal member 5 was prepared from 6,6 nylon. At this time, the resin seal member was injection molded using a mold that had a resin injection inlet at a position corresponding to an edge of the opening on the gelled negative electrode side (i.e., a lower end of the opening of the central cylindrical part in FIGS. 3A AND 3B). The diameter Rb of the opening 10 of the central cylindrical part 5a was set to 1.20 mm in all the batteries. The length L of the portion of the opening 10 in contact with the body 6a of the negative electrode current collector nail 6 was varied in the range of 2.0 to 6.3 mm to provide seven lengths. The diameter Rc of the body 6a of the negative electrode current collector nail 6 was varied in the range of 1.22 to 1.31 mm to provide ten diameters. In this way, a total of 26 kinds of seal units 9 were prepared. In each of these seal units 9, the distance C (C1) between the lower face 6c of the flange 6b of the negative electrode current collector nail 6 and the upper face 5b of the central cylindrical part 5a of the resin seal member 5 was 0.15 mm. Using these seal units 9, AAA-size alkaline dry batteries No. 101 to No. 116 and No. 121 to No. 130 were produced in the same manner as described in the above embodiment. For each of these batteries, 100 test samples were prepared, and a potassium hydroxide aqueous solution with a KOH concentration of 33% by weight was used as the alkaline electrolyte for the positive electrode mixture and the gelled negative electrode.

These test samples were subjected to the following tests 1 and 2.

(Test 1)

For each of the 52 kinds of batteries No. 1 to No. 16, No. 21 to No. 30, No. 101 to No. 116, and No. 121 to No. 130, 50 test samples were stored in a high-temperature environment at 80° C. for 3 months. This test environment is intended to accelerate the damage to the thinned section 5e of the resin seal member 5. Each of these test samples was observed every month, and the number of test samples that leaked due to the breakage of the thinned section 5e among all of the leaked batteries was recorded. After the test, each of the test samples was disassembled, and the distance C (C2) between the lower face 6c of the flange 6b of the negative electrode current collector nail 6 and the upper face 5b of the central cylindrical part 5a of the resin seal member was measured. Then, the difference ΔC between the distance C (C1) and the distance C (C2) and the average value of ΔC for each kind of battery were calculated to obtain the move distance of the resin seal member 5.

(Test 2)

For each of the 52 kinds of batteries No. 1 to No. 16, No. 21 to No. 30, No. 101 to No. 116, and No. 121 to No. 130, 50 test samples were stored in a hot and humid environment at 60° C. and a humidity of 90% for 3 months. This test environment is intended to promote the leakage of the alkaline electrolyte due to creeping between the central cylindrical part 5a of the resin seal member 5 and the negative electrode current collector nail 6. Each of these test samples was observed every month, and the number of test samples that leaked due to the creeping of the alkaline electrolyte between the central cylindrical part 5a and the negative electrode current collector nail 6 among all of the leaked batteries was recorded. After the test, each of the test samples was disassembled, and the distance C (C2) between the lower face 6c of the flange 6b of the negative electrode current collector nail 6 and the upper face 5b of the central cylindrical part 5a of the resin seal member was measured. Then, the difference ΔC between the distance C (C1) and the distance C (C2) and the average value of ΔC for each kind of battery were calculated to obtain the move distance of the resin seal member 5.

Figure 4:
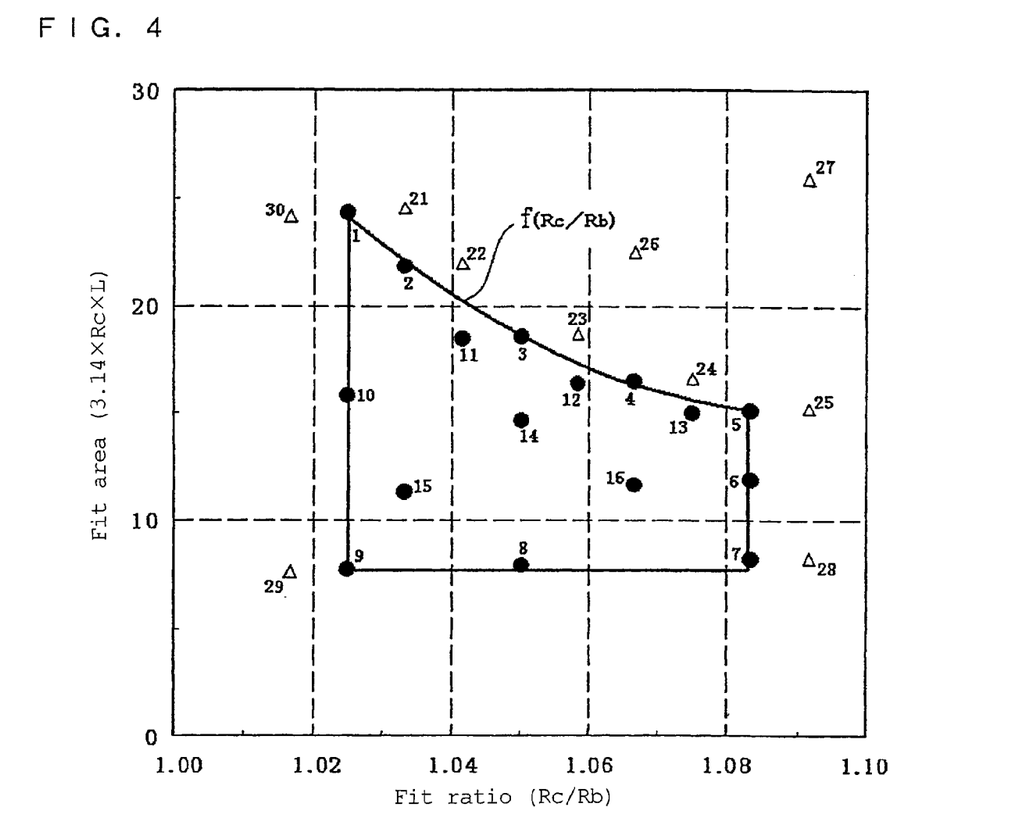
FIG. 4 is a graph showing the region of the fit ratio and fit area of a AA-size alkaline dry battery according to the invention.
Figure 5:
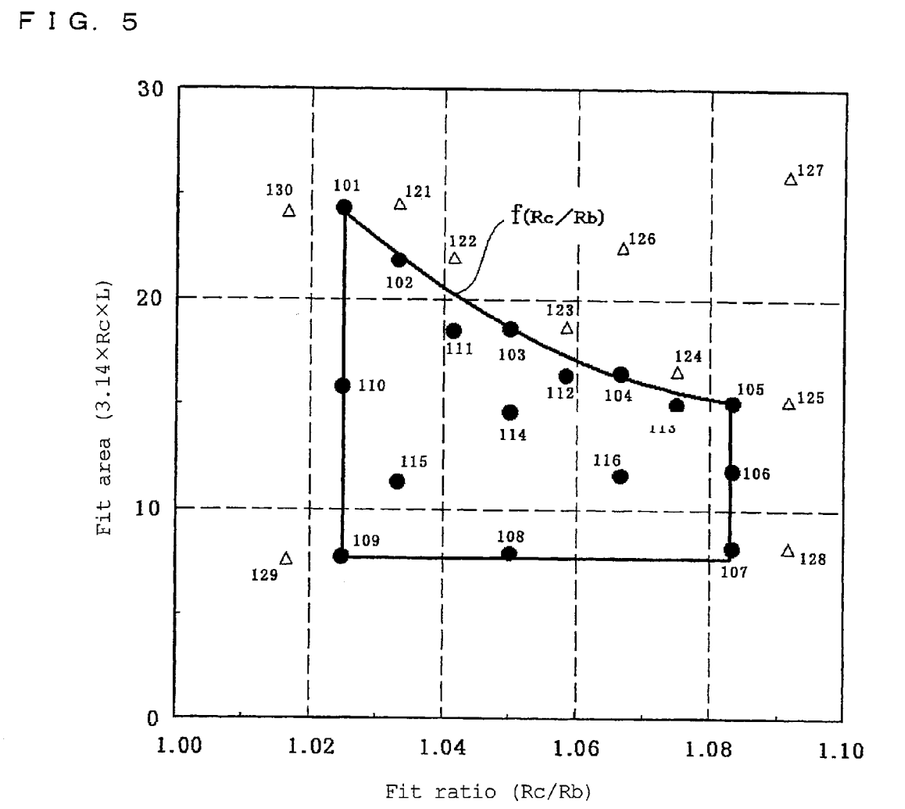
FIG. 5 is a graph showing the region of the fit ratio and fit area of a AAA-size alkaline dry battery according to the invention.

The results of the above tests 1 and 2 are shown in the following Table 1 A, Table 1 B, and Table 1 C. Also, the fit ratios and fit areas of the test samples No. 1 to No. 16 and No. 21 to No. 30 are plotted on FIG. 4, and the fit ratios and fit areas of the test samples No. 101 to No. 116 and No. 121 to No. 130 are plotted on FIG. 5. FIG. 4 and FIG. 5 are rectangular coordinates with the fit ratio as the abscissa and the fit area as the ordinate, and the range satisfying the formulas 1 and 2 is shown as the region surrounded by the thick solid line. Also, on FIG. 4 and FIG. 5, the outlined rectangle represents a leaked test sample, and the black circle represents a test sample that did not leak.

TABLE A

| No. | | Resin seal member Diameter Rb of opening (mm) | Length L (mm) | Negative electrode current collector nail Diameter Rc of body (mm) | Seal unit | |
|---|---|---|---|---|---|---|
| AA-size | AAA-size | | | | Fit ratio Rc/Rb | Fit area 3.14 × Rc × L (mm²) |
| 1 | 101 | 1.20 | 6.30 | 1.23 | 1.025 | 24.3 |
| 2 | 102 | 1.20 | 5.60 | 1.24 | 1.033 | 21.8 |
| 3 | 103 | 1.20 | 4.70 | 1.26 | 1.050 | 18.6 |
| 4 | 104 | 1.20 | 4.10 | 1.28 | 1.067 | 16.5 |
| 5 | 105 | 1.20 | 3.70 | 1.30 | 1.083 | 15.1 |
| 6 | 106 | 1.20 | 2.90 | 1.30 | 1.083 | 11.8 |
| 7 | 107 | 1.20 | 2.00 | 1.30 | 1.083 | 8.2 |
| 8 | 108 | 1.20 | 2.00 | 1.26 | 1.050 | 7.9 |
| 9 | 109 | 1.20 | 2.00 | 1.23 | 1.025 | 7.7 |
| 10 | 110 | 1.20 | 4.10 | 1.23 | 1.025 | 15.8 |
| 11 | 111 | 1.20 | 4.70 | 1.25 | 1.042 | 18.4 |
| 12 | 112 | 1.20 | 4.10 | 1.27 | 1.058 | 16.3 |
| 13 | 113 | 1.20 | 3.70 | 1.29 | 1.075 | 15.0 |

TABLE A-continued

| | | Resin seal member | | Negative electrode current collector | Seal unit | |
|---|---|---|---|---|---|---|
| | | Diameter Rb of opening (mm) | Length L (mm) | nail Diameter Rc of body (mm) | Fit ratio Rc/Rb | Fit area 3.14 × Rc × L (mm²) |
| No. AA-size | AAA-size | | | | | |
| 14 | 114 | 1.20 | 3.70 | 1.26 | 1.050 | 14.6 |
| 15 | 115 | 1.20 | 2.90 | 1.24 | 1.033 | 11.3 |
| 16 | 116 | 1.20 | 2.90 | 1.28 | 1.067 | 11.7 |
| 21 | 121 | 1.20 | 6.30 | 1.24 | 1.033 | 24.5 |
| 22 | 122 | 1.20 | 5.60 | 1.25 | 1.042 | 22.0 |
| 23 | 123 | 1.20 | 4.70 | 1.27 | 1.058 | 18.7 |
| 24 | 124 | 1.20 | 4.10 | 1.29 | 1.075 | 16.6 |
| 25 | 125 | 1.20 | 3.70 | 1.31 | 1.092 | 15.2 |
| 26 | 126 | 1.20 | 5.60 | 1.28 | 1.067 | 22.5 |
| 27 | 127 | 1.20 | 6.30 | 1.31 | 1.092 | 25.9 |
| 28 | 128 | 1.20 | 2.00 | 1.31 | 1.092 | 8.2 |
| 29 | 129 | 1.20 | 2.00 | 1.22 | 1.017 | 7.7 |
| 30 | 130 | 1.20 | 6.30 | 1.22 | 1.017 | 24.1 |

TABLE 1B

AA-size alkaline dry batteries

| No. | Move distance of central cylindrical part of resin seal member (mm) | Test 1: number of leaked test samples upon storage at 80° C. | | | Test 2: number of leaked test samples upon storage at 60° C. and a humidity of 90% | | |
|---|---|---|---|---|---|---|---|
| | | 1 month | 2 months | 3 months | 1 month | 2 months | 3 months |
| 1 | 0.20 | 0 | 0 | 0 | 0 | 0 | 0 |
| 2 | 0.14 | 0 | 0 | 0 | 0 | 0 | 0 |
| 3 | 0.10 | 0 | 0 | 0 | 0 | 0 | 0 |
| 4 | 0.10 | 0 | 0 | 0 | 0 | 0 | 0 |
| 5 | 0.10 | 0 | 0 | 0 | 0 | 0 | 0 |
| 6 | 0.14 | 0 | 0 | 0 | 0 | 0 | 0 |
| 7 | 0.20 | 0 | 0 | 0 | 0 | 0 | 0 |
| 8 | 0.25 | 0 | 0 | 0 | 0 | 0 | 0 |
| 9 | 0.40 | 0 | 0 | 0 | 0 | 0 | 0 |
| 10 | 0.24 | 0 | 0 | 0 | 0 | 0 | 0 |
| 11 | 0.14 | 0 | 0 | 0 | 0 | 0 | 0 |
| 12 | 0.10 | 0 | 0 | 0 | 0 | 0 | 0 |
| 13 | 0.10 | 0 | 0 | 0 | 0 | 0 | 0 |
| 14 | 0.15 | 0 | 0 | 0 | 0 | 0 | 0 |
| 15 | 0.25 | 0 | 0 | 0 | 0 | 0 | 0 |
| 16 | 0.16 | 0 | 0 | 0 | 0 | 0 | 0 |
| 21 | 0.06 | 0 | 3 | 8 | 0 | 0 | 0 |
| 22 | 0.06 | 0 | 4 | 9 | 0 | 0 | 0 |
| 23 | 0.06 | 0 | 5 | 11 | 0 | 0 | 0 |
| 24 | 0.06 | 0 | 4 | 10 | 0 | 0 | 0 |
| 25 | 0.04 | 0 | 8 | 23 | 0 | 0 | 0 |
| 26 | 0.04 | 0 | 9 | 27 | 0 | 0 | 0 |
| 27 | 0.00 | 0 | 11 | 36 | 0 | 0 | 0 |
| 28 | 0.06 | 0 | 2 | 7 | 0 | 0 | 0 |
| 29 | 0.57 | 0 | 0 | 0 | 5 | 50 | 50 |
| 30 | 0.41 | 0 | 0 | 0 | 0 | 22 | 48 |

TABLE 1C

AA-size alkaline dry batteries

| No. | Move distance of central cylindrical part of resin seal member (mm) | Test 1: number of leaked test samples upon storage at 80° C. | | | Test 2: number of leaked test samples upon storage at 60° C. and a humidity of 90% | | |
|---|---|---|---|---|---|---|---|
| | | 1 month | 2 months | 3 months | 1 month | 2 months | 3 months |
| 101 | 0.20 | 0 | 0 | 0 | 0 | 0 | 0 |
| 102 | 0.14 | 0 | 0 | 0 | 0 | 0 | 0 |

TABLE 1C-continued

AA-size alkaline dry batteries

| No. | Move distance of central cylindrical part of resin seal member (mm) | Test 1: number of leaked test samples upon storage at 80° C. | | | Test 2: number of leaked test samples upon storage at 60° C. and a humidity of 90% | | |
|---|---|---|---|---|---|---|---|
| | | 1 month | 2 months | 3 months | 1 month | 2 months | 3 months |
| 103 | 0.10 | 0 | 0 | 0 | 0 | 0 | 0 |
| 104 | 0.10 | 0 | 0 | 0 | 0 | 0 | 0 |
| 105 | 0.10 | 0 | 0 | 0 | 0 | 0 | 0 |
| 106 | 0.14 | 0 | 0 | 0 | 0 | 0 | 0 |
| 107 | 0.20 | 0 | 0 | 0 | 0 | 0 | 0 |
| 108 | 0.25 | 0 | 0 | 0 | 0 | 0 | 0 |
| 109 | 0.40 | 0 | 0 | 0 | 0 | 0 | 0 |
| 110 | 0.24 | 0 | 0 | 0 | 0 | 0 | 0 |
| 111 | 0.14 | 0 | 0 | 0 | 0 | 0 | 0 |
| 112 | 0.10 | 0 | 0 | 0 | 0 | 0 | 0 |
| 113 | 0.10 | 0 | 0 | 0 | 0 | 0 | 0 |
| 114 | 0.15 | 0 | 0 | 0 | 0 | 0 | 0 |
| 115 | 0.25 | 0 | 0 | 0 | 0 | 0 | 0 |
| 116 | 0.16 | 0 | 0 | 0 | 0 | 0 | 0 |
| 121 | 0.05 | 0 | 4 | 9 | 0 | 0 | 0 |
| 122 | 0.05 | 0 | 3 | 8 | 0 | 0 | 0 |
| 123 | 0.05 | 0 | 4 | 10 | 0 | 0 | 0 |
| 124 | 0.05 | 0 | 5 | 12 | 0 | 0 | 0 |
| 125 | 0.03 | 0 | 7 | 21 | 0 | 0 | 0 |
| 126 | 0.03 | 0 | 6 | 25 | 0 | 0 | 0 |
| 127 | 0.00 | 0 | 12 | 37 | 0 | 0 | 0 |
| 128 | 0.06 | 0 | 3 | 9 | 0 | 0 | 0 |
| 129 | 0.50 | 0 | 0 | 0 | 7 | 50 | 50 |
| 130 | 0.41 | 0 | 0 | 0 | 0 | 20 | 45 |

As shown in Table 1B, Table 1C, FIG. 4, and FIG. 5, none of the test samples of No. 1, No. 9, No. 10, No. 101, No. 109, and No. 110 leaked in the tests 1 and 2, whereas many of the test samples of No. 29, No. 30, No. 129, and No. 130 leaked in the test 2. This suggests that when the fit ratio is less than 1.025, leakage is likely to occur due to creeping of alkaline electrolyte.

Also, none of the test samples of No. 5, No. 6, No. 7, No. 105, No. 106, and No. 107 leaked in the tests 1 and 2, while some or many of the test samples of No. 25, No. 27, No. 28, No. 125, No. 127, and No. 128 leaked in the test 1. This indicates that when the fit ratio exceeds 1.083, leakage due to the breakage of the thinned section 5e is likely to occur.

Accordingly, the preferable fit ratio is in the range of 1.025 to 1.083.

Next, the test results are explained in terms of the fit area. Even when the fit area is relatively small, a high fit ratio allows prevention of leakage due to creeping, but a low fit ratio increases the possibility of creeping. From the result that none of the test samples of No. 9 and No. 109 leaked in the test 2, the present inventors have found that when the fit area is at least 7.7 mm² or more, creeping is unlikely to occur even at a fit ratio of 1.025.

On the other hand, when the fit area is large, it is believed that the sliding movement of the central cylindrical part 5a is impeded by increased friction between the negative electrode current collector nail 6 and the central cylindrical part 5a of the resin seal member 5. Also, when the fit ratio is high, it is believed that the sliding movement of the central cylindrical part 5a is also impeded.

Based on such findings, the present inventors have made diligent examinations in Example 1 and found that there is a certain relation between the fit ratio (Rc/Rb) and the upper limit value of the fit area (3.14×Rc×L) in achieving a certain level of leakage resistance. The curve f(Rc/Rb) in FIG. 4 represents the upper boundary of the fit area (3.14×Rc×L) within which both breakage of the thinned section 5e and creeping along the central cylindrical part 5a are unlikely to occur. That is, by approximating the relation between the fit ratio (Rc/Rb) and the fit area (3.14×Rc×L) of the test samples of No. 1 to No. 5 that did not leak in the tests 1 and 2 by a quadratic curve by the least square method, the coefficient of each term of the above f(Rc/Rb) was determined.

In the results of the tests 1 and 2 of the test samples of No. 21 to No. 24, the fit area (3.14×Rc×L) as a function of the fit ratio (Rc/Rb) is beyond the upper boundary f(Rc/Rb). A comparison with these results indicates that leakage can be effectively prevented when the resin seal member 5 and the negative electrode current collector nail 6 are formed such that the fit area (3.14×Rc×L) is within the upper boundary f(Rc/Rb).

The above results show that when the formulas 1 and 2 are satisfied, it is possible to effectively suppress leakage due to creeping between the central cylindrical part 5a of the resin seal member 5 and the negative electrode current collector nail 6 and leakage due to stress cracking and breakage of the thinned section 5e of the resin seal member 5.

Next, in terms of the distance the central cylindrical part 5a of the resin seal member 5 moves due to attachment, the leakage resistance of the alkaline dry battery is described. When the move distance is large, the slidability of the central cylindrical part 5a is high, but the fittability may be too low. Conversely, when the move distance is small, the fittability is high, but the slidability may be too low.

In the case of the AA-size, in the test samples with a move distance of 0.1 mm or less (test samples of No. 21 to No. 28), leakage occurred in the test 1. In the case of the AAA-size, also, in the test samples with a move distance of 0.1 mm or less (test samples of No. 121 to No. 128), leakage occurred in the test 1. This is probably because the slidability of the central cylindrical part 5a is low although the fittability is high. On the other hand, in the AA-size test samples with a move distance of greater than 0.4 mm (test samples of No. 29 and No. 30) and also the AAA-size test samples with a move distance of greater than 0.4 mm (test samples of No. 129 and No. 130), leakage occurred in the test 2. This is probably because the fittability of the central cylindrical part 5a is low although the slidability is high.

Therefore, the results of the tests 1 and 2 of the test samples of No. 1 to No. 16 shown in Table 1A and Table 1B indicate that the preferable move distance for the AA-size is in the range of 0.1 to 0.4 mm. The results of the tests 1 and 2 of the test samples of No. 101 to No. 116 shown in Table 1A and Table 1C demonstrate that the preferable move distance for the AAA-size is also in the range of 0.1 to 0.4 mm. In this case, it is possible to effectively suppress leakage of alkaline electrolyte due to creeping between the central cylindrical part 5a of the resin seal member 5 and the negative electrode current collector nail 6 and leakage due to stress cracking and breakage of the thinned section 5e of the resin seal member 5.

EXAMPLE 3

In Example 3, the practical dimensions of the components of a AA-size alkaline dry battery were examined.

As shown in the following Table 2A, the diameter Rb of the opening 10 of the central cylindrical part 5a of the 6,6 nylon resin seal member 5 was varied to 1.05 mm, 1.25 mm, and 1.45 mm to provide three diameters. Also, the length L was varied to 2.2 mm, 3.0 mm, and 3.8 mm to provide three lengths, and the diameter Rc of the body 6a of the negative electrode current collector nail 6 was varied to 1.08 mm, 1.11 mm, 1.14 mm, 1.27 mm, 1.31 mm, 1.35 mm, 1.47 mm, 1.52 mm, and 1.57 mm to provide nine diameters. In this way, a total of 27 kinds of seal units 9 were prepared. Using these seal units 9, AA-size alkaline dry batteries No. 51 to No. 77 were produced in the same manner as described in the above embodiment. For each of these batteries, 100 test samples were prepared, and these test samples were subjected to the above tests 1 and 2. The results are shown in Table 2B. Also, the calculated values of $f(Rc/Rb)=2048.4(Rc/Rb)^2-4473(Rc/Rb)+2456.9$ for the respective test samples are also shown in Table 2A.

In this Example, also, the resin seal member 5 was injection molded using a mold that had a resin injection inlet at a position corresponding to an edge of the opening on the gelled negative electrode side (i.e., a lower end of the opening of the central cylindrical part in FIGS. 3A AND 3B). The distance C between the lower face 6c of the flange 6b of the negative electrode current collector nail 6 and the upper face 5b of the central cylindrical part 5a of the resin seal member 5 was 0.2 mm. Also, a potassium hydroxide aqueous solution with a KOH concentration of 33% by weight was used as the alkaline electrolyte for the positive electrode mixture and the gelled negative electrode.

EXAMPLE 4

In Example 4, the practical dimensions of the components of a AAA-size alkaline dry battery were examined.

As shown in the following Table 2A, the diameter Rb of the opening 10 of the central cylindrical part 5a of the 6,6 nylon resin seal member 5 was varied to 1.05 mm, 1.25 mm, and 1.45 mm to provide three diameters. Also, the length L was varied to 2.2 mm, 3.0 mm, and 3.8 mm to provide three lengths, and the diameter Rc of the body 6a of the negative electrode current collector nail 6 was varied to 1.08 mm, 1.11 mm, 1.14 mm, 1.27 mm, 1.31 mm, 1.35 mm, 1.47 mm, 1.52 mm, and 1.57 mm to provide nine diameters. In this way, a total of 27 kinds of seal units 9 were prepared. Using these seal units 9, AAA-size alkaline dry batteries No. 151 to No. 177 were produced in the same manner as described in the above embodiment. For each of these batteries, 100 test samples were prepared, and these test samples were subjected to the above tests 1 and 2. The results are shown in Table 2C. Also, the calculated values of $f(Rc/Rb)=2048.4(Rc/Rb)^2-4473(Rc/Rb)+2456.9$ for the respective test samples are also shown in Table 2A.

In this Example, also, the resin seal member 5 was injection molded using a mold that had a resin injection inlet at a position corresponding to an edge of the opening on the gelled negative electrode side (i.e., a lower end of the opening of the central cylindrical part in FIGS. 3A AND 3B). The distance C between the lower face 6c of the flange 6b of the negative electrode current collector nail 6 and the upper face 5b of the central cylindrical part 5a of the resin seal member 5 was 0.15 mm. Also, a potassium hydroxide aqueous solution with a KOH concentration of 33% by weight was used as the alkaline electrolyte for the positive electrode mixture and the gelled negative electrode.

TABLE 2A

| No. | | Resin seal member | | Negative electrode current collector nail | Seal unit | | |
|---|---|---|---|---|---|---|---|
| | | Diameter | | Diameter | | Fit area | |
| AA-size | AAA-size | Rb of opening (mm) | Length L (mm) | Rc of body (mm) | Fit ratio Rc/Rb | $3.14 \times Rc \times L$ (mm²) | F(Rc/Rb) |
| 51 | 151 | 1.05 | 2.20 | 1.08 | 1.029 | 7.5 | 23.2 |
| 52 | 152 | 1.05 | 2.20 | 1.11 | 1.057 | 7.7 | 17.5 |
| 53 | 153 | 1.05 | 2.20 | 1.14 | 1.086 | 7.9 | 15.1 |
| 54 | 154 | 1.25 | 2.20 | 1.27 | 1.016 | 8.8 | 26.8 |
| 55 | 155 | 1.25 | 2.20 | 1.31 | 1.048 | 9.0 | 19.0 |
| 56 | 156 | 1.25 | 2.20 | 1.35 | 1.080 | 9.3 | 15.3 |
| 57 | 157 | 1.45 | 2.20 | 1.47 | 1.014 | 10.2 | 27.5 |
| 58 | 158 | 1.45 | 2.20 | 1.52 | 1.048 | 10.5 | 18.9 |
| 59 | 159 | 1.45 | 2.20 | 1.57 | 1.083 | 10.8 | 15.2 |
| 60 | 160 | 1.05 | 3.00 | 1.08 | 1.029 | 10.2 | 23.2 |
| 61 | 161 | 1.05 | 3.00 | 1.11 | 1.057 | 10.5 | 17.5 |
| 62 | 162 | 1.05 | 3.00 | 1.14 | 1.086 | 10.7 | 15.1 |
| 63 | 163 | 1.25 | 3.00 | 1.29 | 1.032 | 12.2 | 22.4 |
| 64 | 164 | 1.25 | 3.00 | 1.31 | 1.048 | 12.3 | 19.0 |
| 65 | 165 | 1.25 | 3.00 | 1.35 | 1.080 | 12.7 | 15.3 |
| 66 | 166 | 1.45 | 3.00 | 1.47 | 1.014 | 13.8 | 27.5 |

TABLE 2A-continued

| No. AA-size | No. AAA-size | Resin seal member Diameter Rb of opening (mm) | Length L (mm) | Negative electrode current collector nail Diameter Rc of body (mm) | Fit ratio Rc/Rb | Seal unit Fit area 3.14 × Rc × L (mm²) | F(Rc/Rb) |
|---|---|---|---|---|---|---|---|
| 67 | 167 | 1.45 | 3.00 | 1.52 | 1.048 | 14.3 | 18.9 |
| 68 | 168 | 1.45 | 3.00 | 1.57 | 1.083 | 14.8 | 15.2 |
| 69 | 169 | 1.05 | 3.80 | 1.08 | 1.029 | 12.9 | 23.2 |
| 70 | 170 | 1.05 | 3.80 | 1.11 | 1.057 | 13.2 | 17.5 |
| 71 | 171 | 1.05 | 3.80 | 1.14 | 1.086 | 13.6 | 15.1 |
| 72 | 172 | 1.25 | 3.80 | 1.29 | 1.032 | 15.4 | 22.4 |
| 73 | 173 | 1.25 | 3.80 | 1.31 | 1.048 | 15.6 | 19.0 |
| 74 | 174 | 1.25 | 3.80 | 1.35 | 1.080 | 16.1 | 15.3 |
| 75 | 175 | 1.45 | 3.80 | 1.47 | 1.014 | 17.5 | 27.5 |
| 76 | 176 | 1.45 | 3.80 | 1.52 | 1.048 | 18.1 | 18.9 |
| 77 | 177 | 1.45 | 3.80 | 1.57 | 1.083 | 18.7 | 15.2 |

TABLE 2B

AA-size alkaline dry batteries

| No. | Move distance of central cylindrical part of resin seal member (mm) | Test 1: number of leaked test samples upon storage at 80° C. | | | Test 2: number of leaked test samples upon storage at 60° C. and a humidity of 90% | | |
|---|---|---|---|---|---|---|---|
| | | 1 month | 2 months | 3 months | 1 month | 2 months | 3 months |
| 51 | 0.45 | 0 | 0 | 0 | 4 | 46 | 50 |
| 52 | 0.25 | 0 | 0 | 0 | 0 | 0 | 0 |
| 53 | 0.08 | 0 | 1 | 5 | 0 | 0 | 0 |
| 54 | 0.50 | 0 | 0 | 0 | 6 | 50 | 50 |
| 55 | 0.25 | 0 | 0 | 0 | 0 | 0 | 0 |
| 56 | 0.16 | 0 | 0 | 0 | 0 | 0 | 0 |
| 57 | 0.50 | 0 | 0 | 0 | 6 | 50 | 50 |
| 58 | 0.22 | 0 | 0 | 0 | 0 | 0 | 0 |
| 59 | 0.14 | 0 | 0 | 0 | 0 | 0 | 0 |
| 60 | 0.32 | 0 | 0 | 0 | 0 | 0 | 0 |
| 61 | 0.22 | 0 | 0 | 0 | 0 | 0 | 0 |
| 62 | 0.08 | 0 | 2 | 8 | 0 | 0 | 0 |
| 63 | 0.23 | 0 | 0 | 0 | 0 | 0 | 0 |
| 64 | 0.18 | 0 | 0 | 0 | 0 | 0 | 0 |
| 65 | 0.14 | 0 | 0 | 0 | 0 | 0 | 0 |
| 66 | 0.44 | 0 | 0 | 0 | 4 | 49 | 50 |
| 67 | 0.16 | 0 | 0 | 0 | 0 | 0 | 0 |
| 68 | 0.10 | 0 | 0 | 0 | 0 | 0 | 0 |
| 69 | 0.24 | 0 | 0 | 0 | 0 | 0 | 0 |
| 70 | 0.16 | 0 | 0 | 0 | 0 | 0 | 0 |
| 71 | 0.08 | 0 | 2 | 7 | 0 | 0 | 0 |
| 72 | 0.21 | 0 | 0 | 0 | 0 | 0 | 0 |
| 73 | 0.16 | 0 | 0 | 0 | 0 | 0 | 0 |
| 74 | 0.06 | 0 | 4 | 10 | 0 | 0 | 0 |
| 75 | 0.41 | 0 | 0 | 0 | 0 | 1 | 14 |
| 76 | 0.12 | 0 | 0 | 0 | 0 | 0 | 0 |
| 77 | 0.04 | 0 | 8 | 23 | 0 | 0 | 0 |

TABLE 2C

AAA-size alkaline dry batteries

| No. | Move distance of central cylindrical part of resin seal member (mm) | Test 1: number of leaked test samples upon storage at 80° C. | | | Test 2: number of leaked test samples upon storage at 60° C. and a humidity of 90% | | |
|---|---|---|---|---|---|---|---|
| | | 1 month | 2 months | 3 months | 1 month | 2 months | 3 months |
| 151 | 0.43 | 0 | 0 | 0 | 6 | 42 | 50 |
| 152 | 0.25 | 0 | 0 | 0 | 0 | 0 | 0 |

TABLE 2C-continued

AAA-size alkaline dry batteries

| No. | Move distance of central cylindrical part of resin seal member (mm) | Test 1: number of leaked test samples upon storage at 80° C. | | | Test 2: number of leaked test samples upon storage at 60° C. and a humidity of 90% | | |
|---|---|---|---|---|---|---|---|
| | | 1 month | 2 months | 3 months | 1 month | 2 months | 3 months |
| 153 | 0.07 | 0 | 2 | 6 | 0 | 0 | 0 |
| 154 | 0.45 | 0 | 0 | 0 | 7 | 50 | 50 |
| 155 | 0.25 | 0 | 0 | 0 | 0 | 0 | 0 |
| 156 | 0.16 | 0 | 0 | 0 | 0 | 0 | 0 |
| 157 | 0.45 | 0 | 0 | 0 | 5 | 50 | 50 |
| 158 | 0.22 | 0 | 0 | 0 | 0 | 0 | 0 |
| 159 | 0.14 | 0 | 0 | 0 | 0 | 0 | 0 |
| 160 | 0.32 | 0 | 0 | 0 | 0 | 0 | 0 |
| 161 | 0.22 | 0 | 0 | 0 | 0 | 0 | 0 |
| 162 | 0.08 | 0 | 1 | 5 | 0 | 0 | 0 |
| 163 | 0.23 | 0 | 0 | 0 | 0 | 0 | 0 |
| 164 | 0.18 | 0 | 0 | 0 | 0 | 0 | 0 |
| 165 | 0.14 | 0 | 0 | 0 | 0 | 0 | 0 |
| 166 | 0.43 | 0 | 0 | 0 | 6 | 45 | 50 |
| 167 | 0.16 | 0 | 0 | 0 | 0 | 0 | 0 |
| 168 | 0.10 | 0 | 0 | 0 | 0 | 0 | 0 |
| 169 | 0.24 | 0 | 0 | 0 | 0 | 0 | 0 |
| 170 | 0.16 | 0 | 0 | 0 | 0 | 0 | 0 |
| 171 | 0.06 | 0 | 3 | 9 | 0 | 0 | 0 |
| 172 | 0.21 | 0 | 0 | 0 | 0 | 0 | 0 |
| 173 | 0.16 | 0 | 0 | 0 | 0 | 0 | 0 |
| 174 | 0.05 | 0 | 5 | 12 | 0 | 0 | 0 |
| 175 | 0.41 | 0 | 0 | 0 | 0 | 2 | 13 |
| 176 | 0.12 | 0 | 0 | 0 | 0 | 0 | 0 |
| 177 | 0.03 | 0 | 7 | 25 | 0 | 0 | 0 |

In the case of the AA-size, among the test samples in Table 2 in which the diameter Rb of the opening 10 ranges from 1.05 to 1.45 mm, the length L ranges from 2.2 to 3.8 mm, and the diameter Rc of the body 6a ranges from 1.08 to 1.57 mm, none of the test samples of No. 52, No. 55, No. 56, No. 58 to No. 61, No. 63 to No. 65, No. 67 to No. 70, No. 72, No. 73 and No. 76 satisfying the formulas 1 and 2 leaked in the tests 1 and 2. Also, in all of these leak-free test samples, the move distance was within the range of 0.1 to 0.4 mm.

Likewise, in the case of the AAA-size, among the test samples in Table 2 in which the diameter Rb of the opening 10 ranges from 1.05 to 1.45 mm, the length L ranges from 2.2 to 3.8 mm, and the diameter Rc of the body 6a ranges from 1.08 to 1.57 mm, none of the test samples of No. 152, No. 155, No. 156, No. 158 to No. 161, No. 163 to No. 165, No. 167 to No. 170, No. 172, No. 173, and No. 176 satisfying the formulas 1 and 2 leaked in the tests 1 and 2. Also, in all of these leak-free test samples, the move distance was within the range of 0.1 to 0.4 mm.

Also, the present inventors obtained commercially available AA-size alkaline dry batteries A to G and AAA-size alkaline dry batteries H to M and conducted the same tests 1 and 2 as those in Examples 1 and 2 except that the number of test samples was 10 for each battery. These results are shown in Table 3 and Table 4.

TABLE 3

AA-size alkaline dry batteries

| | Test 1: number of leaked test samples upon storage at 80° C. | | | Test 2: number of leaked test samples upon storage at 60° C. and a humidity of 90% | | |
|---|---|---|---|---|---|---|
| | 1 month | 2 months | 3 months | 1 month | 2 months | 3 months |
| Commercial battery A | 0 | 0 | 2 | 0 | 1 | 4 |
| Commercial battery B | 0 | 0 | 2 | 0 | 8 | 10 |
| Commercial battery C | 0 | 1 | 2 | 0 | 4 | 7 |
| Commercial battery D | 0 | 2 | 5 | 0 | 0 | 0 |
| Commercial battery E | 0 | 0 | 2 | 0 | 0 | 2 |
| Commercial battery F | 0 | 2 | 2 | 0 | 10 | 10 |
| Commercial battery G | 0 | 2 | 3 | 0 | 3 | 3 |

TABLE 4

| | AAA-size alkaline dry batteries | | | | | |
|---|---|---|---|---|---|---|
| | Test 1: number of leaked test samples upon storage at 80° C. | | | Test 2: number of leaked test samples upon storage at 60° C. and a humidity of 90% | | |
| | 1 month | 2 months | 3 months | 1 month | 2 months | 3 months |
| Commercial battery H | 0 | 2 | 8 | 1 | 1 | 2 |
| Commercial battery I | 0 | 0 | 1 | 0 | 0 | 10 |
| Commercial battery J | 0 | 2 | 5 | 0 | 0 | 1 |
| Commercial battery K | 0 | 0 | 1 | 0 | 0 | 0 |
| Commercial battery L | 0 | 0 | 2 | 6 | 10 | 10 |
| Commercial battery M | 0 | 0 | 0 | 0 | 6 | 10 |

All kinds of these commercially available dry batteries exhibited leakage in both tests 1 and 2, which confirmed that the invention has an excellent effect.

The alkaline dry battery of the invention has excellent leakage resistance and can be preferably used as the power source for any devices.

Although the invention has been described in terms of the presently preferred embodiments, it is to be understood that such disclosure is not to be interpreted as limiting. Various alterations and modifications will no doubt become apparent to those skilled in the art to which the invention pertains, after having read the above disclosure. Accordingly, it is intended that the appended claims be interpreted as covering all alterations and modifications as fall within the true spirit and scope of the invention.

The invention claimed is:

1. An alkaline dry battery comprising: a battery case with an opening for housing power generating elements including an alkaline electrolyte; and a seal unit for closing the opening of the battery case, wherein the seal unit includes: a negative electrode terminal plate; a negative electrode current collector having a columnar body and electrically connected to the negative electrode terminal plate; and a resin seal member, the resin seal member includes: a central cylindrical part having an opening through which the body of the negative electrode current collector is inserted; an outer peripheral cylindrical part interposed between a peripheral edge of the negative electrode terminal plate and an open edge of the battery case; a connecting part connecting the central cylindrical part and the outer peripheral cylindrical part; and a thinned section formed in the connecting part and configured to break due to gas pressure, the seal unit is attached to the opening of the battery case to seal the opening of the battery case by bending the open edge of the battery case over an upper edge of the outer peripheral cylindrical part of the seal member and crimping it inward to compress the peripheral edge of the negative electrode terminal plate, and the negative electrode current collector and the resin seal member satisfy the following formulas 1 and 2:

$$1.02 \leq Rc/Rb \leq 1.08 \tag{1}$$

$$7.7 \leq 3.14 \times Rc \times L \leq f(Rc/Rb) \tag{2}$$

where Rc represents the diameter (mm) of the body of the negative electrode current collector, Rb represents the diameter (mm) of the opening of the central cylindrical part of the resin seal member, L represents the length (mm) of the opening of the central cylindrical part of the resin seal member, and $$f(Rc/Rb); f(Rc/Rb) = 2048.4(Rc/Rb)^2 - 4473(Rc/Rb) + 2456.9.$$

2. The alkaline dry battery in accordance with claim 1, wherein the alkaline dry battery is of the AA or AAA size, and when the seal unit is attached to the opening of the battery case, the central cylindrical part of the resin seal member moves in the axial direction of the body of the negative electrode current collector for a distance of 0.1 to 0.4 mm.

3. The alkaline dry battery in accordance with claim 1, wherein the alkaline dry battery is of the AA or AAA size, and the opening of the central cylindrical part of the resin seal member has a diameter of 1.05 to 1.45 mm.

4. The alkaline dry battery in accordance with claim 1, wherein the alkaline dry battery is of the AA or AAA size, and the opening of the central cylindrical part of the resin seal member has a length of 2.2 to 3.8 mm.

5. The alkaline dry battery in accordance with claim 1, wherein the alkaline dry battery is of the AA or AAA size, and the body of the negative electrode current collector has a diameter of 1.08 to 1.57 mm.

6. An alkaline dry battery in accordance with claim 1, wherein the thinned section of the resin seal member does not break in an environment at 80° C. for at least 3 months, and the alkaline electrolyte does not leak between the central cylindrical part of the resin seal member and the body of the negative electrode current collector inserted through the opening of the central cylindrical part in an environment at 60° C. and a humidity of 90% for at least 3 months.

\* \* \* \* \*